C. A. & W. C. MICHAELI.
RIDING ATTACHMENT FOR PLOWS AND THE LIKE.
APPLICATION FILED FEB. 9, 1916.

1,188,298.  Patented June 20, 1916.

Witnesses

C. A. Michaeli and
W. C. Michaeli  Inventors by

Attorneys

UNITED STATES PATENT OFFICE.

CLARENCE A. MICHAELI AND WALTER C. MICHAELI, OF OROSI, CALIFORNIA.

RIDING ATTACHMENT FOR PLOWS AND THE LIKE.

1,188,298.   Specification of Letters Patent.   Patented June 20, 1916.

Application filed February 9, 1916. Serial No. 77,350.

*To all whom it may concern:*

Be it known that we, CLARENCE A. MICHAELI and WALTER C. MICHAELI, citizens of the United States, residing at Orosi, in the county of Tulare, State of California, have invented a new and useful Riding Attachment for Plows and the like, of which the following is a specification.

This invention relates to riding attachments for plows and the like, one of the objects of the invention being to provide a simple form of attachment which can be applied readily to the beam of a plow or other like agricultural implement, the said attachment including a trailing portion on which the seat is mounted and which trailing portion is capable of moving upwardly and downwardly so as to ride easily over an uneven surface.

A further object is to provide a riding attachment which is cheap to manufacture, is formed of but few parts, and will not readily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
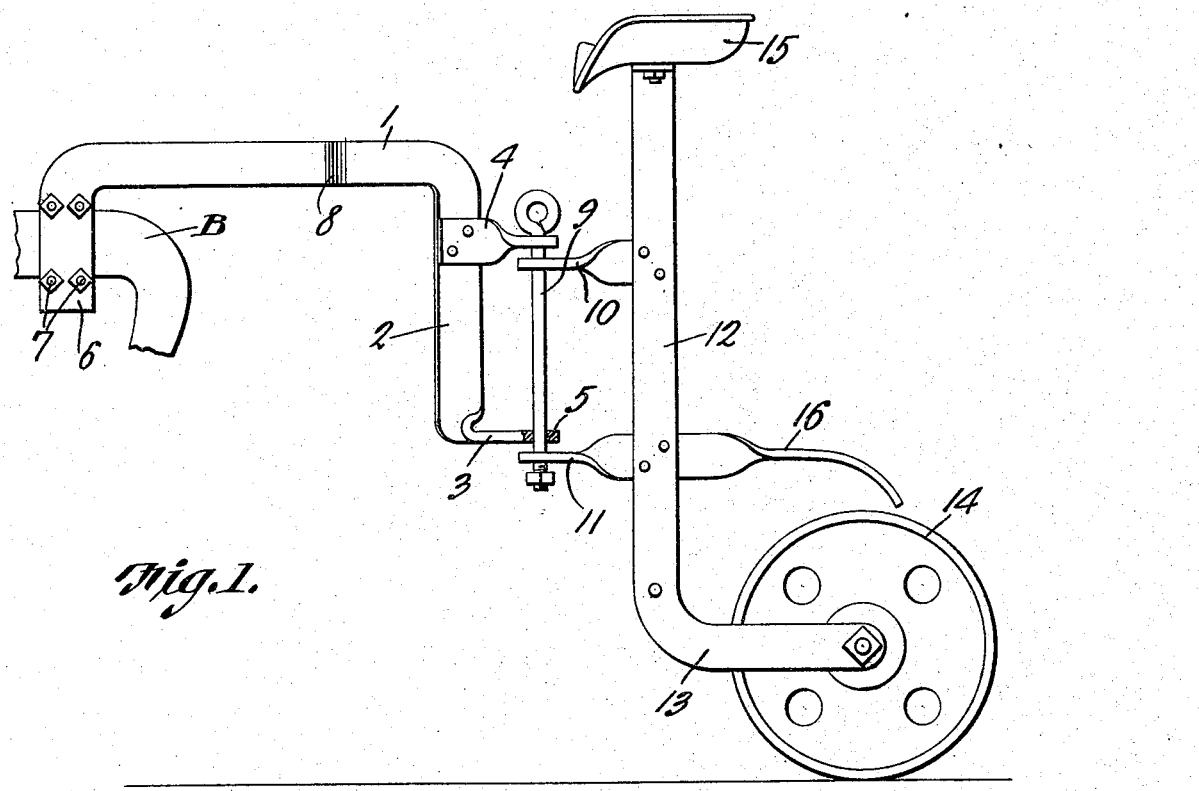
Figure 2:
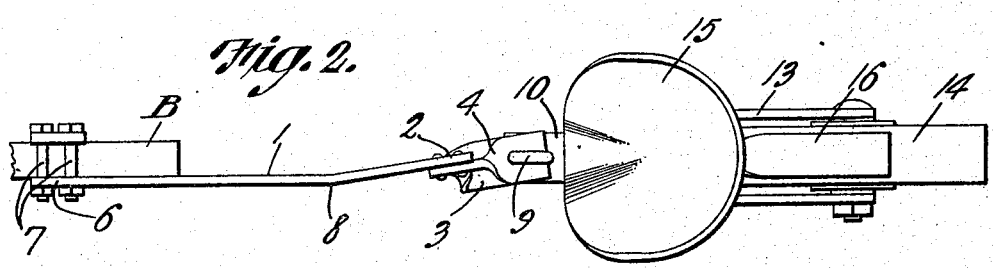

In said drawings: Figure 1 is a side elevation of the attachment. Fig. 2 is a plan view thereof.

Referring to the figures by characters of reference 1 designates a coupling bar having a depending rear portion 2 provided at its lower end with a rearwardly extending ear 3 and, adjacent its upper end, with a rearwardly extending tongue 4 overhanging the ear, both the tongue and the ear being provided with openings 5. The front end of the connecting bar is downturned, as at 6 and is adapted to engage one side of the beam B of a plow or the like and to be held thereto by a bolt 7 or any other suitable means. The bar 1 is preferably offset laterally at an intermediate point so that the depending portion 2 thereof will thus be brought to position directly in rear of the beam B. This offset portion has been indicated at 8.

The openings 5 in the ear 3 and tongue 4 receive a pivot pin 9 which extends through forwardly extending superposed tongues 10 and 11 fixedly connected to a standard 12. The lower portion of the standard is forked and extended rearwardly, as indicated at 13 and journaled within this forked portion is a supporting wheel 14. A seat 15 is mounted on the upper end of the standard and, if desired, the lower tongue 11 can be made integral with a rearwardly extending scraper 16 terminating close to and above the wheel 14.

It is to be understood that a device such as herein described can be attached readily to the beam of a plow or the like and, when the plow is drawn forward, the standard 12 and its supporting wheel 14 will trail thereafter. The pin 9 is of such length as to permit the tongues 10 and 11 to slide upwardly and downwardly thereon, thus to permit a limited up and down movement of the standard relative to the beam and which obviously enables the attachment to travel more easily over an uneven surface than would otherwise be possible. The tongues 10 and 11 are preferably extended under the tongue 4 and the ear 3 respectively although it is to be understood that, if preferred, these tongues can be extended over the tongue 4 and ear 3 respectively.

What is claimed is:—

1. A riding attachment for plows and the like, including a coupling bar having a depending rear portion, means for fixedly connecting said bar to the beam of a plow or other structure, rearwardly extending members upon the downwardly extending portion, a pivot pin carried thereby, a wheel supported standard, a seat upon the standard, and tongues extending forwardly from the standard and pivotally mounted on the pin.

2. A riding attachment for plows and the like, including a coupling bar having a depending rear portion, means for fixedly connecting said bar to the beam of a plow or other structure, rearwardly extending members upon the downwardly extending portion, a pivot pin carried thereby, a wheel supported standard, a seat upon the standard, and tongues extending forwardly from the standard and pivotally mounted on the pin, said tongues being slidable longitudinally of the pin.

3. A riding attachment for plows and the like, including a coupling bar, means for fixedly connecting it to a plow or other structure, said bar having a depending rear portion, rearwardly extending projections upon said portion, a pivot pin removably mounted within said rearwardly extending projections, a standard having a rearwardly projecting lower end portion, a supporting wheel journaled within said lower end portion, a seat upon the upper end of the standard, tongues extending forwardly from the standard and pivotally mounted on the pivot pin, said tongues being movable upwardly and downwardly upon the pin, and a scraper integral with one of the tongues and supported close to and above the wheel.

In testimony that we claim the foregoing as our own, we have hereto affixed our signatures in the presence of two witnesses.

CLARENCE A. MICHAELI.
WALTER C. MICHAELI.

Witnesses:
J. R. LEADBETTER,
W. V. ANDREWS.

Copies of this patent may be obtained for five cents each, by addressing the "Commissioner of Patents, Washington, D. C."